United States Patent
Op't Roodt

(10) Patent No.: US 8,595,888 B2
(45) Date of Patent: Dec. 3, 2013

(54) WIPER BLADE

(75) Inventor: Inigo Op't Roodt, Hasselt (BE)

(73) Assignee: Robert Bosch GmbH, Stuttgart (DE)

( * ) Notice: Subject to any disclaimer, the term of this patent is extended or adjusted under 35 U.S.C. 154(b) by 507 days.

(21) Appl. No.: 12/935,219

(22) PCT Filed: Feb. 9, 2009

(86) PCT No.: PCT/EP2009/051431
§ 371 (c)(1),
(2), (4) Date: Jan. 5, 2011

(87) PCT Pub. No.: WO2009/124792
PCT Pub. Date: Oct. 15, 2009

(65) Prior Publication Data
US 2011/0107542 A1  May 12, 2011

(30) Foreign Application Priority Data
Apr. 8, 2008  (DE) .......................... 10 2008 001 045

(51) Int. Cl.
*B60S 1/40* (2006.01)
*B60S 1/38* (2006.01)

(52) U.S. Cl.
USPC .............. 15/250.201; 15/250.43; 15/250.361; 15/250.32

(58) Field of Classification Search
USPC ........... 15/250.361, 250.43, 250.201, 250.32, 15/250.33, 250.351, 250.44
See application file for complete search history.

(56) References Cited

U.S. PATENT DOCUMENTS

| | | | |
|---|---|---|---|
| 2006/0282972 A1* | 12/2006 | Huang | 15/250.201 |
| 2007/0022556 A1* | 2/2007 | Walworth et al. | 15/250.201 |
| 2008/0222833 A1* | 9/2008 | Henin et al. | 15/250.201 |
| 2009/0056049 A1 | 3/2009 | Jarasson et al. | |
| 2010/0050360 A1* | 3/2010 | Chiang | 15/250.32 |

FOREIGN PATENT DOCUMENTS

| | | | |
|---|---|---|---|
| DE | 10000373 | * | 8/2001 |
| DE | 100 36 115 | | 1/2003 |
| DE | 10 2005 062 462 | | 6/2007 |
| EP | 2 008 891 | | 12/2008 |
| FR | 2 868 376 | | 10/2005 |
| RU | 2238198 | | 10/2004 |
| WO | WO 2006/117081 | | 11/2006 |

* cited by examiner

*Primary Examiner* — Gary Graham
(74) *Attorney, Agent, or Firm* — Merchant & Gould P.C.

(57) ABSTRACT

The invention relates to a wiper blade (10) having a wiper strip (50), the head strip (56) of which is held by a receiving profile (30, 62, 70), which is connected to a longitudinal channel (60) for a support element (12), wherein a connecting element (16) is provided in the center region of the wiper blade (10) for the articulated connection to a wiper arm. The invention provides that the connecting element (16) forms part of the longitudinal channel (60) along with a connecting plate (22) in that the connecting plate (22) forms the side facing the wiper strip (50) with the base (24) thereof, and encloses the support element (12, 92) with the side walls (26) thereof, while the connecting element (16) forms the side opposite the base (24) and overlaps the side walls (26) with side parts (44) thereof, wherein part of the receiving profile (30) is integrally formed on the base (24) of the connecting plate (22) toward the wiper strip (50).

10 Claims, 3 Drawing Sheets

WIPER BLADE

This application is a National Stage Application of PCT/EP2009/051431, filed 9 Feb. 2009, which claims benefit of Serial No. 10 2008 001 045.6, filed 8 Apr. 2008 in Germany and which applications are incorporated herein by reference. To the extent appropriate, a claim of priority is made to each of the above disclosed applications.

TECHNICAL FIELD

The invention relates to a wiper blade according to the preamble of claim 1.

A wiper blade, which has a plastic carrier, is known from the German patent publication DE 10 2005 062 462 A1. This carrier has a central longitudinal channel for receiving a support element in the form of a spring rail. In order to connect a wiper strip to the carrier, said carrier has a receiving profile in the form of two mutually opposed retaining rails. Said retaining rails comprise a back strip, which via a web is integrally formed on the head strip of the wiper strip, said retaining rails forming a longitudinal slot for the web between themselves. Support strips, on which a spoiler is supported and which have recesses on their ends, are provided on the longitudinal sides of said carrier at the height of the longitudinal channel. Said support strips serve to secure end caps, which are placed on the ends of said carrier and which engage with lobes on the inward side thereof in the recesses of said carrier. Said carrier additionally has recesses in the center region on the outer longitudinal sides of its support strips in order to fix a connecting element in the longitudinal direction, via which the wiper blade is connected to the wiper arm in articulated manner. In one embodiment of the invention, the connecting element is covered by a cover cap having attachment profiles for the spoiler parts.

In another exemplary embodiment, the wiper blade comprises two spring rails as the support element. In this case, the carrier has a t-shaped profile in cross section, which is connected to the receiving profile via the web, instead of the longitudinal channel. The spring rails are inserted into the lateral longitudinal grooves formed in this manner. In so doing, the spoiler parts having longitudinal guides enclose the parts of said spring rails that project out of the longitudinal grooves.

In a further exemplary embodiment, the longitudinal channel and the receiving profile are integrally connected to the spoiler by the component being manufactured in a multicomponent extrusion process. The carrier part advantageously has in the process a greater hardness than the spoiler.

SUMMARY

According to the invention, the connecting element forms part of the longitudinal channel along with a connecting plate in that the connecting plate forms the side facing the wiper strip with the base thereof, and encloses the support element with the side walls thereof. Said connecting element forms the side opposite the base and overlaps the side walls of said connecting plate with side parts thereof. Part of the receiving profile is integrally formed on the base of said connecting plate toward the wiper strip. The wiper blade advantageously comprises only a few different parts and is easy to install. At the same time, the support element, which can comprise one or a plurality of spring rails, is protected in the longitudinal channel and is very flexible. Moreover, relative movements between the longitudinal channel and the support element produce only a slight amount of friction.

The side parts of the connecting element can overlap the side walls of the connecting plate on the inside or on the outside. For optical and air flow reasons, they advantageously encompass the side walls from the outside. It is thereby advantageous according to one embodiment of the invention for the connecting element to have detent lugs on the side parts thereof, with which it can be clipped onto said connecting plate. If the side walls of said connecting element lie on the outside, they additionally include if need be inwardly pointing detent lugs, which project through recesses in the side walls of said connecting plate and catch on the support element.

Opposite the connecting plate and consequently opposite the connecting element, the support element is advantageously fixed in the longitudinal direction to the base of the connecting plate by a centering pin, which engages in a centering hole of said support element.

The connecting element has a longitudinal web, on which a bearing axis is provided in a direction transverse to the longitudinal direction, for the articulated connection of the wiper blade to a wiper arm. Said bearing axis is advantageously configured as two mutually opposed journals as a bearing hub or as other suitable bearing elements.

If the wiper blade has a spoiler, it is advantageous for the connecting element to have in each case a connecting profile on the ends thereof for the spoiler parts. Said parts attach in the longitudinal direction to the connecting profiles of said connecting element and partially project into said connecting profiles, so that the spoiler parts form part of the longitudinal channel and the receiving profile and extend the corresponding section of the connecting plate and the corresponding section of said connecting element. The face sides of said spoiler parts thereby rest against a step of said connecting element in the region of the side parts. This step lies in turn against a projecting guide rail of the connecting plate opposite to the side walls of said connecting plate. The spoiler parts are therefore guided between the guide rails and the connecting profiles and the mutually abutting components are fixed to each other in the longitudinal direction.

The ends of the wiper blade are advantageously closed by end caps, which in extension of the longitudinal channel of the spoiler parts have in each case an end channel for the support element and in extension of the receiving profile of the spoiler parts have receiving profiles for the head strip of the wiper strip. If the support element comprises only one spring rail, said rail is advantageously fixed on the ends thereof in the longitudinal direction relative to the end caps using a borehole, by way of a detent lug of an end cap in each case engaging in the associated borehole.

BRIEF DESCRIPTION OF THE DRAWINGS

Additional advantages ensue from the following description of the drawings. Exemplary embodiments of the invention are depicted in the drawings. The drawings, the description and the claims contain numerous features in combination. The specialist in the field will also advantageously consider the features individually and put them together in meaningful combinations.

The following are shown.

DETAILED DESCRIPTION

Figure 1:
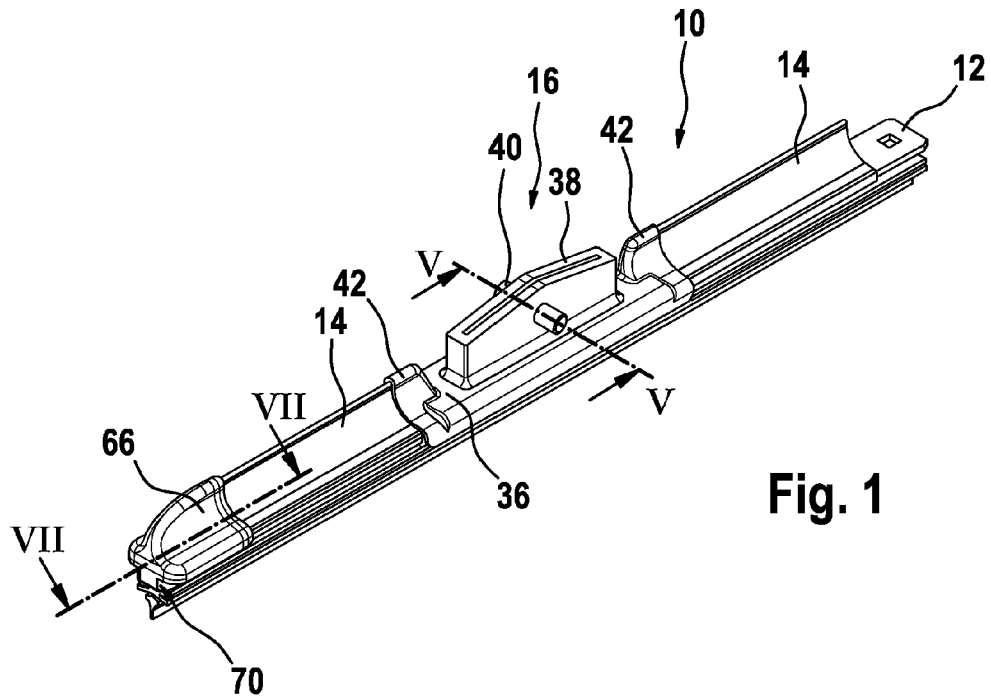
FIG. 1 a perspective depiction of a wiper blade according to the invention.
Figure 2:
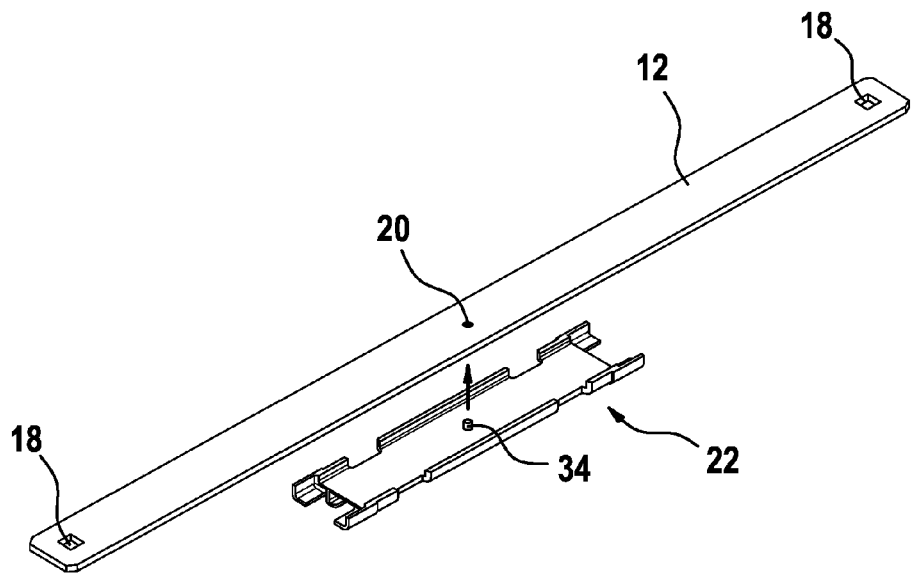
FIG. 2 an exploded view of a support element with a connecting plate.
Figure 3:
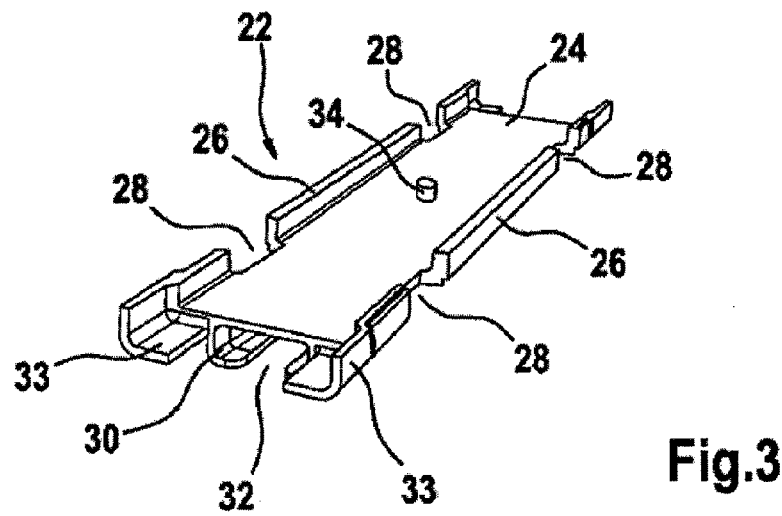
FIG. 3 a perspective depiction of a connecting plate in an enlarged scale.
Figure 4:
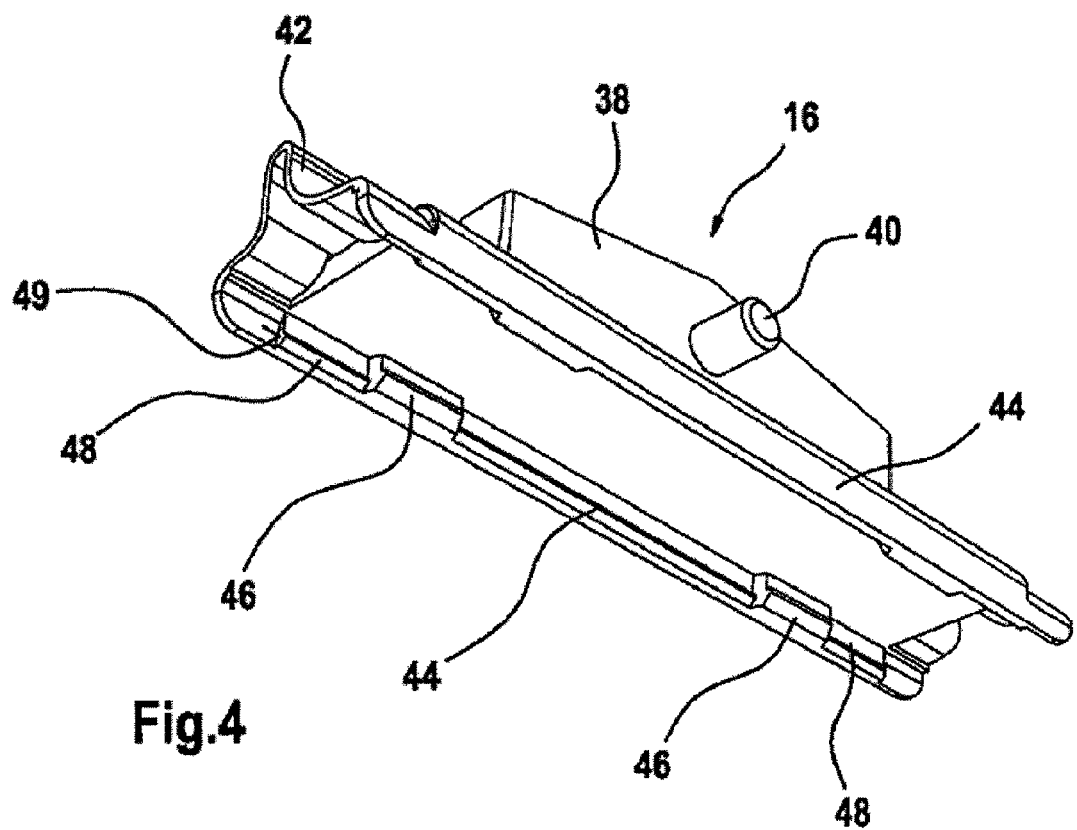
FIG. 4 a perspective depiction of a connecting element from below.
Figure 5:
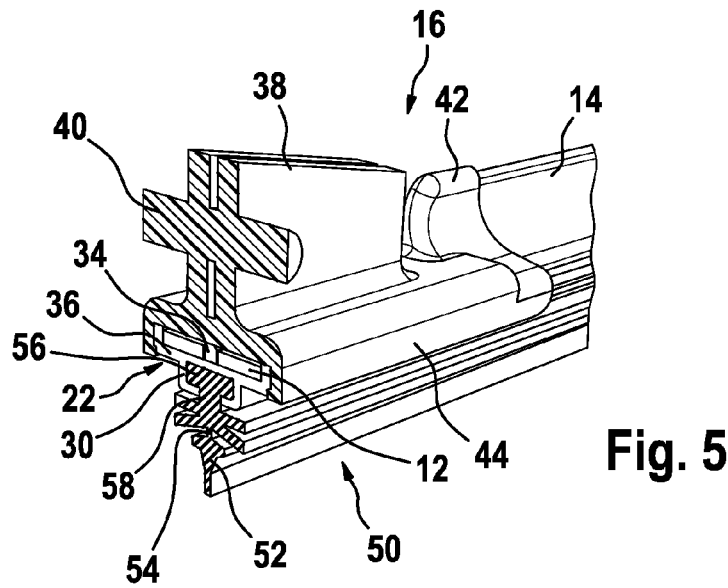
FIG. 5 a perspective sectional view corresponding to the line V-V in FIG. 1.
Figure 6:
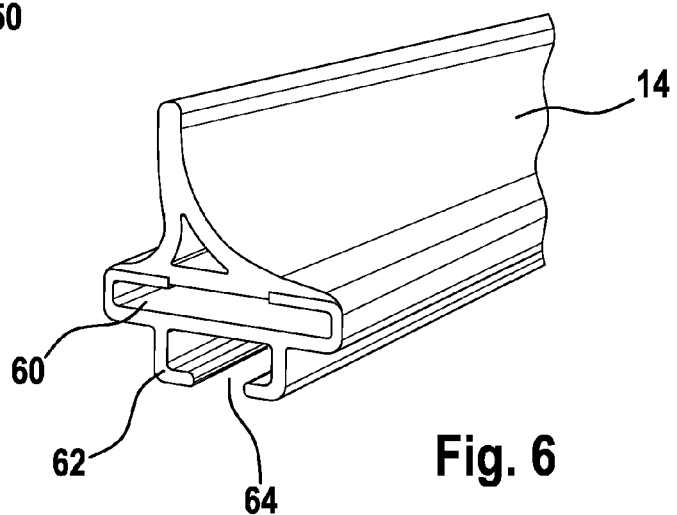
FIG. 6 a perspective front view of a spoiler.
Figure 7:
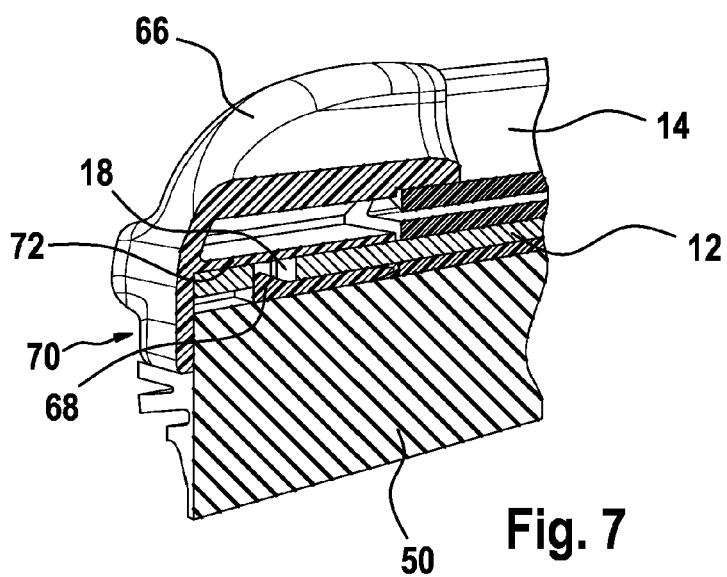
FIG. 7 a perspective sectional view corresponding to the line VII-VII.

A wiper blade 10 has one or a plurality of spring rails as a support element 12, which are accommodated in a longitudinal channel 60. The longitudinal channel 60 is comprised of a plurality of sections, namely of sections in spoiler parts 14 and of a center section, which is formed from a connecting element 16 and a connecting plate 22. The support element 12 has boreholes 18 on the ends thereof, in which detents of the end caps 66 engage in order to secure said caps with respect to the support element 12 in the longitudinal direction.

The support element 12 has a centering hole 20 in the center region, in which a centering pin 34 of the connecting plate 22 engages if said support element 12 is inserted into the profile having a U-shaped cross-section of said connecting plate 22. The position of said connecting plate 22 is thereby secured relative to the support element 12. Said connecting plate 22 encloses the longitudinal sides of said support element 12 with the side walls 26 thereof, a broadside of said support element 12 being covered by a base of said connecting plate 22 which connects said side walls 26.

The connecting element 16 is installed from the open side of the connecting plate 22 in that the side parts 44, which are connected with each other by means of a base 36, overlap the side walls 26 of said connecting plate 22, and namely in the present case from the outside. Said connecting plate 22 and said connecting element 16 thus form the center section of the longitudinal canal 60 for the support element 12. Said connecting element 16 has connecting profiles 42 on the ends thereof, the inside contour of which is offset in an outward direction with respect to the side parts 44 by means of a step 49, for connecting the spoiler parts 14 to said connecting element 16, respectively to said connecting plate 22. Guide rails 33, which protrude laterally with respect to the side walls 26 and in a longitudinal direction with respect to the base 24, are provided on the ends of said connecting plate 22. In the assembled state, the steps 49 of said connecting element 16 rest against the mutually facing end faces of the guide rails 33; thus enabling said connecting element 16 to be fixed between said guide rails 33 in the longitudinal direction. At the same time, said connecting element 16 is held by detent lugs 48 on said connecting plate 22; while additional detent lugs 46 project in an inward direction through recesses 28 in the side walls 26 of the connecting plate 22 and catch on the support element 12.

The connecting element 16 has a longitudinal web 38 on a side of the base 36 facing away from a wiper strip 50. Said longitudinal web 38 has a bearing element arranged transverse to the longitudinal direction and configured as two lateral journals 40 for the articulated connection to a wiper arm that is not shown.

On the side facing away from the connecting element 16, the connecting plate 22 has a receiving profile 30 integrally formed on the base 24, which has a longitudinal slot 32 directed towards the wiper strip 50. Said wiper strip 50 has a head strip 56, which is divided by a web 58 and can thus be inserted into the receiving profile 30. In so doing, the longitudinal slot 32 forms the space for the web 58. The head strip 56 is connected on the side facing away from said receiving profile 30 to a wiper lip 52 via a swiveling web 54.

On both sides of the connecting plate 22, the receiving profile 30 is extended by means of receiving profiles 62, which are integrally formed on the longitudinal channel 60 of the spoiler members 14. Receiving profiles 70 are attached to receiving profiles 62, which have a longitudinal slot 64, in the region of the end caps 66, an end channel 72 being provided in the end caps 66 for the ends of the support element 12. If said support element 12 comprises only one spring rail, said rail is advantageously fixed on the ends thereof in the longitudinal direction relative to the end caps 66 using a borehole. In so doing, a detent lug 68 of an end cap 66 engages in each case in the associated borehole 18.

The invention claimed is:

1. Wiper blade having a wiper strip, a head strip of which is held by a receiving profile, which is connected to a longitudinal channel for a support element, wherein a connecting element is provided in a center region of the wiper blade for an articulated connection to a wiper arm, wherein the connecting element forms part of the longitudinal channel along with a connecting plate in that the connecting plate forms a side facing the wiper strip with a base thereof, and encloses the support element with side walls thereof, while said connecting element forms a side opposite the base and overlaps the side walls with side parts thereof, wherein part of the receiving profile is integrally formed on the base of said connecting plate toward the wiper strip, wherein the connecting plate has a centering pin, which engages in a centering hole of the support element, on the side of the base thereof which faces the connecting element.

2. The wiper blade according to claim 1, wherein the connecting element has detent lugs on the side parts thereof, with which it can be clipped onto the connecting plate.

3. The wiper blade according to claim 1, wherein the connecting element has inwardly pointing detent lugs, which project through recesses in the side walls of the connecting plate and catch on the support element, which overlap said side walls of said connecting plate from the outside.

4. The wiper blade according to claim 1, wherein the connecting element has a longitudinal web, on which a bearing axis is provided in a direction transverse to the longitudinal direction.

5. The wiper blade according to claim 1, furthering including a spoiler, and the connecting element has a connecting profile for spoiler parts on ends thereof and forms a step in the region of the side parts, said step resting against guide rails of the connecting plate which protrude opposite the side walls of said connecting plate.

6. The wiper blade according to claim 5, wherein the spoiler parts are attached in the longitudinal direction to the connecting profiles of the connecting element and partially project into said connecting profiles, said spoiler parts forming part of the longitudinal channel and part of the receiving profile and extend the corresponding sections of the connecting plate and the corresponding sections of said connecting element.

7. The wiper blade according to claim 1, wherein end caps are provided on ends thereof, said end caps having in extension of a longitudinal channel of spoiler parts in each case an end channel for the support element and in extension of a receiving profile of said spoiler parts receiving profiles for the head strip of the wiper strip.

8. The wiper blade according to claim 1, wherein the support element comprises only one spring rail, which has boreholes on the ends thereof, in which a detent lug of an end cap in each case engages.

9. Wiper blade having a wiper strip, a head strip of which is held by a receiving profile, which is connected to a longitudinal channel for a support element, wherein a connecting element is provided in a center region of the wiper blade for an articulated connection to a wiper arm, wherein the connecting element forms part of the longitudinal channel along with a connecting plate in that the connecting plate forms a side facing the wiper strip with a base thereof, and encloses the support element with side walls thereof, while said connecting element forms a side opposite the base and overlaps the side walls with side parts thereof, wherein part of the receiving profile is integrally formed on the base of said connecting plate toward the wiper strip, the wiper blade furthering including a spoiler, and the connecting element has a connecting profile for spoiler parts on ends thereof and forms a step in the region of the side parts, said step resting against guide rails of the connecting plate which protrude opposite the side walls of said connecting plate, wherein the spoiler parts are attached in the longitudinal direction to the connecting profiles of the connecting element and partially project into said connecting profiles, said spoiler parts forming part of the longitudinal channel and part of the receiving profile and extend the corresponding sections of the connecting plate and the corresponding sections of said connecting element.

10. Wiper blade having a wiper strip, a head strip of which is held by a receiving profile, which is connected to a longitudinal channel for a support element, wherein a connecting element is provided in a center region of the wiper blade for an articulated connection to a wiper arm, wherein the connecting element forms part of the longitudinal channel along with a connecting plate in that the connecting plate forms a side facing the wiper strip with a base thereof, and encloses the support element with a side walls thereof, while said connecting element forms a side opposite the base and overlaps the side walls with side parts thereof, wherein part of the receiving profile is integrally formed on the base of said connecting plate toward the wiper strip, the wiper blade furthering including a spoiler, and the connecting element has a connecting profile for spoiler parts on ends thereof and forms a step in the region of the side parts, said step resting against guide rails of the connecting plate which protrude opposite the side walls of said connecting plate.

\* \* \* \* \*